July 9, 1935. R. P. WIEBKING 2,007,699
REEL
Filed Aug. 17, 1933
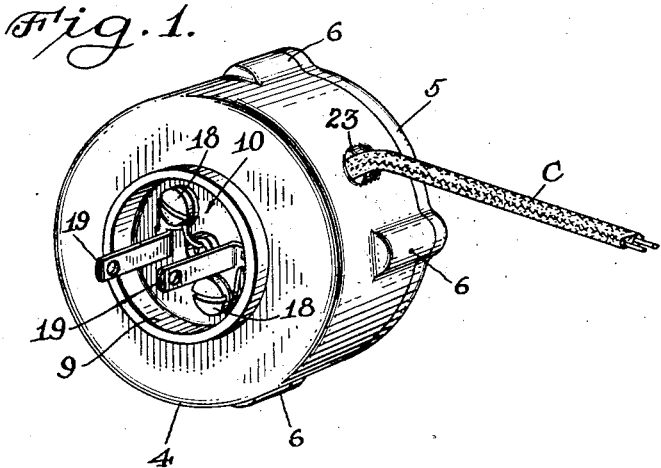
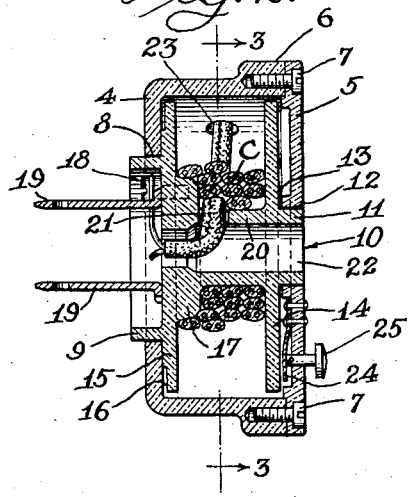
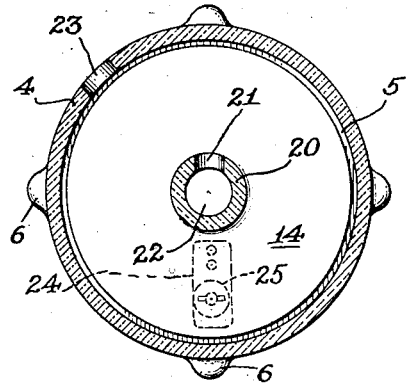
INVENTOR
Robert P. Wiebking
BY Wm. O. Belt
ATTORNEY Patented July 9, 1935

2,007,699

UNITED STATES PATENT OFFICE 2,007,699

REEL

Robert P. Wiebking, Chicago, Ill.

Application August 17, 1933, Serial No. 685,564

3 Claims. (Cl. 173—367)

This invention relates to reels especially adapted for winding lamp cord or other electrical conductors.

Reading lamps, heating devices, fans and other electrical appliances usually have a predetermined length of lamp cord connected thereto, the free end of which is equipped with an attaching plug adapted for connection in an electrical outlet whereby the appliance may be connected in an electrical circuit. Frequently it is not necessary to use the entire length of lamp cord provided and the excess length coils on the floor and presents an unsightly appearance and is otherwise objectionable. The salient object of my invention is to eliminate any excess length of lamp cord or the like between an electrical appliance and an outlet by winding any excess lamp cord or the like on a reel and thereby obviate the unsightly appearance and other objections accruing from the presence of an excessive length of lamp cord or the like.

Another object is to incorporate an attachment plug in the reel for the excessive length of lamp cord or the like whereby the reel may be directly mounted on an electrical outlet when the attachment plug is connected therein.

Further objects are to utilize the prongs of the attachment plug as a handle for manipulating the reel; to insure uniform winding of the lamp cord or the like in the reel to thereby prevent snarling or the like; to yieldingly retain the reel against unwinding movement; and to provide a reel of simple and economical construction and which will be efficient in use and pleasing in appearance.

A selected embodiment of the invention is illustrated in the accompanying drawing wherein Fig. 1 is a perspective view;

Fig. 2 is a vertical transverse sectional view; and

Fig. 3 is a sectional view substantially on the line 3—3 of Fig. 2.

The preferred embodiment of my invention illustrated in the accompanying drawing includes a substantially cup-shaped housing 4 having an open side adapted to be closed by a removable plate 5. At suitable intervals about the periphery of the housing 4 adjacent the open side thereof are bosses 6 having tapped openings therein adapted to receive machine screws 7 or the like for connecting the plate 5 to the housing 4. Preferably the heads of the machine screws are disposed in countersunk openings in the plate 5 so that the heads of the screws are flush with the face of the plate. The housing 4 and the plate 5 are preferably made of non-conductive material and may be formed by molding, stamping or the like.

The part constituting the bottom of the housing 4 has a medially located opening 8 therein in which a flange 9 is rotatably journaled. The flange 9 is unitary with the rotor 10 of the reel mounted in the housing and this rotor includes a hub 11 that is rotatably journaled in a medially located opening in the plate 5 and hence the rotor 10 is supported for rotative movement in the housing 4 by the flange 9 and the hub 11.

An inwardly directed flange 13 is provided about the opening 12 and abuts a radially extending plate 14 unitary with the rotor 10 and positioned at the inner end of the hub 11. Another radially extending plate 15 unitary with the rotor 10 is positioned at the inner end of the flange 9 so that the outwardly disposed face thereof abuts that part of the housing 4 constituting the bottom thereof and this face of the plate 15 is relieved at the periphery of the plate, as indicated at 16, to reduce friction.

An enlarged boss 17 is provided on the rotor 10 immediately inward of the plate 15 and this boss provides an anchorage for terminal screws 18 or the like. The prongs 19 are shaped in the customary manner, are held in place by rivets or by being molded directly in the rotor 10, and are preferably spaced apart and positioned relative to each other to permit convenient connection thereof in a standard electrical outlet. The inner ends of the prongs 19 are seated in a recess defined by the flange 9 which flange projects beyond the outer face of that part of the housing 4 providing the bottom thereof and the free edge of this flange engages the face of the outlet to slightly space the outer face of the bottom of the housing from the outlet.

The lamp cord or the like adapted to be wound in the reel is wound upon the hub 20 of the rotor, which hub is located between the plates 14 and 15, and a part of the cord will also wind upon the periphery of the boss 17. An opening 21 is provided in the hub 20 and one end of the lamp cord or the like is passed through this opening into the axial bore 22 in the rotor so that corresponding ends of the conductors in the lamp cord or the like may be respectively connected to the attachment prongs 19. An opening 23 is provided in the periphery of the housing 4 and the lamp cord C or the like is passed through this opening. The free end of the cord C is connected to the electrical appliance with which my novel reel is to be used.

The prongs 19 provide a convenient handle which may be grasped to rotate the rotor 10 to thereby wind the lamp cord C on the hub 20 and any excessive length of lamp cord between the appliance and the outlet box is so wound after which the prongs 19 are connected in the outlet in the usual manner. Additional lamp cord or the like may be withdrawn by detaching the prongs from the outlet and then pulling upon the cord so as to withdraw it through the opening 23. Any excessive lamp cord may be wound in the housing 4 by merely grasping the prongs 19 and turning the rotor 10 in the proper direction.

In winding lamp cord, especially that of the twisted kind, there is a tendency for the lamp cord to unwind and twist which might result in snarling and I therefore provide means for applying tension to the rotor during the winding thereof and this means consists of the leaf spring 24 fast on the inner face of the plate 5 and normally spaced from the outwardly disposed face of the plate 14. A button 25 is provided and when moved inwardly this button depresses the leaf spring 24 and forces it into engagement with the plate 14 and therefore retards movement of the rotor and prevents unwinding of the lamp cord or the like during the winding operation and in this way snarling or other objectionable winding is prevented.

The reel which I have provided may be conveniently used with an electrical appliance having lamp cord or the like connected thereto and any excessive lamp cord between the appliance and an outlet may be conveniently wound in the reel which thereby obviates unsightly appearance and the like and while I have illustrated and described a preferred form of my reel it is to be understood that this is capable of variation and modification and I therefore do not wish to be limited to the precise details set forth but desire to avail myself of such changes and alterations as fall within the ambit of the following claims:

I claim:

1. A reel for a lamp cord or the like comprising a housing having an open side, a removable plate closing the open side of said housing, said removable plate and the wall of the housing opposite said plate having aligned medially located openings therein, a rotor, a circular flange at one end of the rotor and journaled in the opening in said wall and projecting slightly outwardly of said wall, said rotor having a recess therein surrounded by said flange, a radially extending plate on said rotor at the inner end of said flange and engaging the inner side of said wall, said plate having the peripheral portion thereof juxtaposed to said wall relieved to reduce friction attendant to movement of said plate over said wall, an axially located boss on said rotor adjacent said plate and aligned with said recess, attachment prongs mounted in said boss and insulated from each other and extending through said recess and projecting beyond the free edge of said flange, an inwardly extending rib on said removable plate about the opening therein, a radially extending plate on said rotor and engaging the inner end of said rib, a part on said rotor extending outwardly of the second named radially extending plate and journaled in the opening in said removable plate, a hub on said rotor intermediate said boss and the second named radially extending plate, said rotor having an axial bore therein, said hub having an opening therein leading to said bore, said housing having an opening therein in a wall thereof and through which a length of lamp cord or the like may be extended to be passed through the opening in said hub and said axial bore whereby the ends of the conductors of said lamp cord may be connected to said prongs, said prongs affording a handle to turn said rotor to wind said lamp cord on said hub between said radially extending plates.

2. A reel for a lamp cord or the like comprising a housing having bearing openings in opposite walls thereof and a cord opening in the wall intermediate said opposite walls, a rotor having a hub at one end thereof journaled in one of said bearing openings and having an axially extending circular flange at the other end thereof journaled in the other of said bearing openings, a boss on said rotor extending inwardly of said circular flange, attachment prongs mounted in said boss and projecting outwardly from said housing and beyond the free edge of said circular flange and insulated from each other, said rotor having a bore therein extending through said boss and opening adjacent said attachment prongs, said rotor also having an opening in the part thereof confined in said housing and communicating with said bore whereby a length of lamp cord passed through said cord opening and the opening in said rotor and through said bore may have the conductors thereof respectively connected to said attachment prongs, said attachment prongs affording a handle which may be grasped to rotate said rotor and wind the length of lamp cord on the rotor in said housing.

3. A reel for a lamp cord or the like comprising a housing having bearing openings in opposite walls thereof and a cord opening in the wall intermediate said opposite walls, a rotor having axially spaced radially extending plates thereon and including a hub extending outwardly of one of said plates journaled in one of said bearing openings and having an outwardly extending circular flange on the other of said plates journaled in the other of said bearing openings, a boss on the inner side of said flange bearing plate and aligned with that part of the plate bounded by the flange, attachment prongs mounted in said boss and projecting outwardly from said housing and beyond the free edge of said circular flange and insulated from each other, said rotor having a bore therein extending through said boss and opening adjacent said attachment prongs, said rotor also having an opening therein intermediate said plates and communicating with said bore whereby a length of lamp cord passed through said cord opening and the opening in said rotor and through said boss may have the conductors thereof respectively connected to said attachment prongs, said attachment prongs affording a handle which may be grasped to rotate said rotor and wind the length of lamp cord on said rotor intermediate said plates.

ROBERT P. WIEBKING.